(12) United States Patent
Sakai et al.

(10) Patent No.: US 6,461,406 B1
(45) Date of Patent: Oct. 8, 2002

(54) HONEYCOMB TYPE GAS SEPARATING MEMBRANE STRUCTURE

(75) Inventors: Hitoshi Sakai, Nagoya; Tomonori Takahashi, Chita, both of (JP)

(73) Assignee: NGK Insulators, Ltd., Najoya (JP)

( * ) Notice: Subject to any disclaimer, the term of this patent is extended or adjusted under 35 U.S.C. 154(b) by 0 days.

(21) Appl. No.: 09/667,930

(22) Filed: Sep. 22, 2000

(30) Foreign Application Priority Data

Oct. 6, 1999 (JP) .............................. 11-285971

(51) Int. Cl.[7] .............................. B01D 53/22
(52) U.S. Cl. .................. 95/45; 95/55; 96/4; 96/11
(58) Field of Search .............. 96/4, 7, 8, 11, 96/14; 95/55, 56, 45

(56) References Cited

U.S. PATENT DOCUMENTS

| 3,837,146 A | * | 9/1974 | Faure et al. ................. 96/7 |
| 5,034,023 A | | 7/1991 | Thompson ................. 55/2 |
| 5,149,340 A | * | 9/1992 | Waycuilis ............... 96/11 X |
| 5,298,341 A | * | 3/1994 | Khandkar et al. .......... 96/4 X |
| 5,356,728 A | | 10/1994 | Balachandran et al. ......... 429/8 |
| 5,611,931 A | | 3/1997 | Liu et al. ............... 210/653 |
| 5,674,301 A | | 10/1997 | Sakai et al. ................. 48/61 |
| 5,958,091 A | | 9/1999 | Sakai et al. ................. 48/61 |
| 6,077,436 A | * | 6/2000 | Rajnik et al. ............. 96/4 X |
| 6,168,648 B1 | * | 1/2001 | Ootani et al. .............. 96/7 X |

FOREIGN PATENT DOCUMENTS

| GB | 2257054 A | | 1/1993 | |
| JP | 59-048135 | * | 11/1984 | ................. 96/4 |
| JP | 7-67528 | | 7/1995 | |
| JP | 53-43153 | | 11/1998 | |

OTHER PUBLICATIONS

U. Balachandran et al., "Development of Mixed–conducting Oxides for Gas Separation," Solid State Ionics, 108 (1998), pp. 363–370.

* cited by examiner

Primary Examiner—Robert H. Spitzer
(74) Attorney, Agent, or Firm—Burr & Brown

(57) ABSTRACT

A honeycomb type gas separating membrane structure for separating or supplying a specified gas from a mixed gas is provided. The gas separating membrane structure has a honeycomb unitary structure and is a dense body made of a material having a gas separation ability. The honeycomb type gas separating membrane structure does not require a support for supporting a gas separating membrane, increases the membrane area, and reduces costs because its production process is simple.

8 Claims, 5 Drawing Sheets

GAS FLOW $P_1$ : PRESSURE AT HIGH PRESSURE SIDE
$P_2$ : PRESSURE AT LOW PRESSURE SIDE
$P$  : DIFFERENCE IN PRESSURE ($=P_2-P_1$)
$\ell$ : CELL SPAN
$h$  : THICKNESS OF CELL PARTITION WALL

HONEYCOMB TYPE GAS SEPARATING MEMBRANE STRUCTURE

BACKGROUND OF THE INVENTION

The present invention relates to a honeycomb type (i.e., honeycomb shaped structure) gas separating membrane structure for separating or supplying a specified gas from a mixed gas. Particularly, the present invention relates to a honeycomb type gas separating membrane structure having a honeycomb unitary structure.

A method using a gas separating membrane as a method for separating or supplying a specified gas from a mixed gas has been conventionally used. Generally, a gas separating membrane selectively separates ions or atoms diffused therein. It has been known that gas permeability is inversely proportional to the thickness of the membrane. Therefore, it is preferable to reduce the thickness of the membrane as much as possible to increase the gas permeability of the gas separating membrane.

However, when the gas separating membrane is thinner than a certain degree, the mechanical strength is reduced, and the gas separating membrane cannot stand by itself. Therefore, a gas separating membrane is generally formed on an inorganic porous support made of porous glass, porous ceramics, porous aluminum oxide, or the like (e.g., Japanese Patent Publication 53-43153).

It is also preferable to enlarge the area per unit volume of the gas separating membrane to produce a compact and inexpensive gas separating membrane module. To realize this, Japanese Patent Laid-Open No. 8-40703 discloses a method for forming a gas separating membrane on a predetermined surface of a porous substrate having the shape of a monolith with through-holes, Japanese Patent Laid-Open No. 9-255306 discloses a method for forming a gas separating membrane on a metallic porous support with a metallic reinforcing plate having a plurality of gas flow holes, and U.S. Pat. No. 5,356,728 discloses a gas separating membrane which is made of a material having gas separation ability and which has a plurality of parallel through-holes running in a vertical direction so as to mutually cross each other.

Further, Japanese Patent Publication 7-67528 discloses a honeycomb porous body in a ceramic membrane structure for condensing and separating condensable gas components. It is stated that a ceramic thin membrane having numerous continuous fine pores for condensing condensable gas components are loaded on inner surfaces of partition walls. It is preferable that the fine pores have an average pore diameter of 100Å or less, and that the membrane has a thickness of 5–100 $\mu$m. It is also disclosed that a porous partition wall, which becomes a support for imparting strength, preferably has an average pore diameter of 0.2–5 $\mu$m and a thickness of about 0.5–3 mm.

However, in the case where a gas separation membrane is formed on a predetermined surface of a porous substrate (Japanese Patent Laid-Open No. 8-40703), it is very difficult to form a dense gas separating membrane on the porous substrate because of the difference in properties (e.g., thermal expansion coefficient) between the porous substrate and the gas separation membrane.

Another problem is that, in the case of a gas separating membrane having a layered structure (Japanese Patent Laid-Open No. 9-255306 and U.S. Pat. No. 5,356,728), though the membrane area can be enlarged, the production process becomes complex and the cost is increased.

Further, Japanese Patent Publication 7-67528 discloses that it is not considered that forming a membrane after molding a honeycomb body is necessary and a partition wall of a substrate is particularly thinned to 0.5–3 mm.

SUMMARY OF THE INVENTION

The present invention has been made in view of such conditions and aims to provide a honeycomb type gas separating membrane structure which does not require a support member for supporting the gas separating membrane, which can increase the membrane area, which has a simple production process, and which reduces costs.

According to the present invention, a honeycomb type gas separating membrane structure for separating or supplying a specified gas from a mixed gas is provided, wherein the gas separating membrane structure has a honeycomb unitary structure and is a dense body made of a material having a gas separation ability. It is preferable that a cell partition wall between a raw material gas side and a permeated gas side of the honeycomb type gas separating membrane structure has a thickness of 50–500 $\mu$m. It is also preferable that a gas flow passage on the raw material gas side and a gas flow passage on the permeated gas side are disposed so that they mutually cross each other at predetermined intervals.

BRIEF DESCRIPTION OF THE DRAWINGS

FIG. 1(a) is a schematic perspective view, and FIG. 1(b) is a sectional view along the line A—A of FIG. 1(a).

FIG. 4(a) is the case of a square, and FIG. 4(b) is the case of a circle.

DETAILED DESCRIPTION OF THE INVENTION

A honeycomb type gas separating membrane structure of the present invention has a honeycomb unitary structure and is a dense body made of a material having a gas separation ability.

According to the honeycomb type gas separating membrane structure, a support member for supporting the gas separating membrane is unnecessary, the membrane area can be enlarged, and costs are reduced because the production process is simple.

Further, it is possible to apply a catalyst powder mixed with a solvent to promote surface reactions on both the raw material gas side and a permeated gas side of a honeycomb type gas separating membrane structure by slurry-coating, dip-coating, or the like, and subjecting the membrane structure to heat treatment. The catalyst does not have to be dense, and the production process is very easy in comparison with forming a function membrane.

From the above, a honeycomb type gas separating membrane structure of the present invention can be applied to an oxygen permeable membrane using a mixed conductive material represented by perovskite oxide, layered perovskite oxide, zirconia (or the like) where a metal is dispersed, or to a hydrogen permeable membrane using a proton conductive material oxide, a hydrocarbon selectively-permeating membrane using zeolite, or the like. However, any gas separating membrane structure can be applied to such a membrane as long as it is a dense material having gas separation ability.

The present invention is hereinbelow described in detail on the basis of the drawings.

Figure 1A:
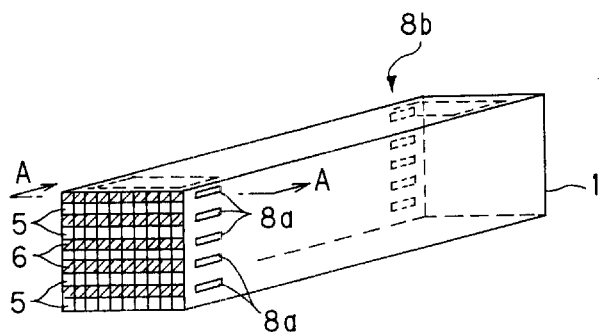
FIGS. 1(a) and 1(b) show an embodiment of a honeycomb type gas separating membrane structure of the present invention.
Figure 1B:
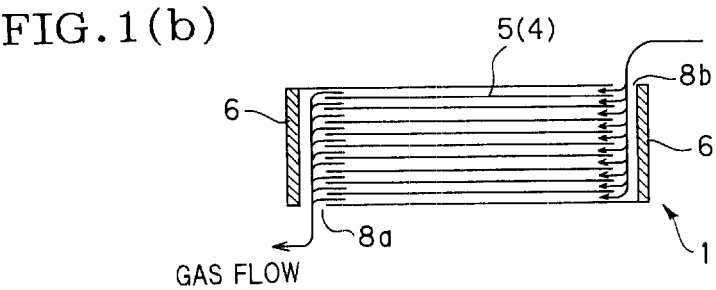

FIGS. 1(a) and 1(b) show an embodiment of a honeycomb type gas separating membrane structure of the present invention. FIG. 1(a) is a schematic perspective view, and FIG. 1(b) is a sectional view along the line A—A of FIG. 1(a).

One embodiment of a honeycomb separator membrane structure of the present invention is a square honeycomb type gas separating membrane structure 1 having a plurality of parallel cell passages 4 as shown in FIG. 1(a). Gas flow passages 5 on a raw material gas side or a permeated gas side constituted by the cell passages 4 are disposed so as to mutually cross each other.

In one of the gas flow passage 5 on the raw material gas side and the gas flow passage 5 on the permeated gas side, the parallel cell passage 4 is sealed with a sealing material 6 at both ends thereof. Slits 8a and 8b are formed on the side face of the honeycomb type gas separating membrane structure 1 corresponding to the sealed cell passage 4 so as to pass through the side face of the cell passage 4 as shown in FIG. 1(b).

By this, a gas on the raw material gas side or the permeated gas side can stay in the gas flow passage for a sufficient time, and therefore the gas contact efficiency on the raw material gas side and the permeated gas side can be improved.

The main characteristic of a honeycomb type gas separating membrane structure of the present invention is that the gas separating membrane itself is formed to have a dense honeycomb structure. This enables the gas separating membrane itself to self-support its weight, thereby a support means for supporting the gas separating membrane is unnecessary. Therefore, the production process can be simplified and costs can be reduced in comparison with a conventional gas separating membrane having a stratified structure.

Further, the thickness of a cell partition wall and a cell span of the above honeycomb structure can be easily optimized in accordance with a difference in pressure between the raw material gas side and the permeated gas side. In a honeycomb type gas separating membrane structure of the present invention, a cell partition wall between the raw material gas side and the permeated gas side preferably has a thickness of 50–500 $\mu$m.

In more detail, in the case that there is almost no difference in pressure between the raw material gas side and the permeated gas side, the thickness of a cell partition wall and a cell pitch can be freely selected. For example, the cell partition wall may be thinned to about 50 $\mu$m which does not give any pinholes.

Figure 2:
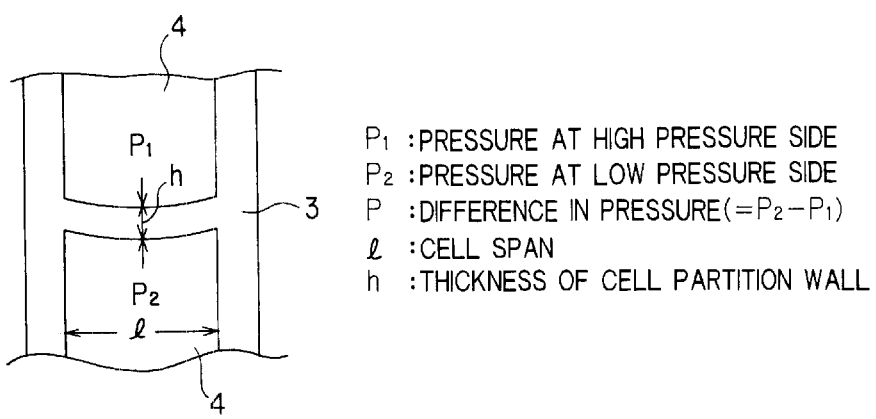
FIG. 2 is an explanatory view about a model of a beam structure supported at both ends of a honeycomb type gas separating membrane structure of the present invention.

On the other hand, when there is a difference in pressure between the raw material gas side and the permeated gas side, it is necessary to select the thickness of the cell partition wall and a cell pitch according to the difference in pressure. For example, in the case of a model having a beam structure supported at both ends as shown in FIG. 2, the strength of a material necessary to apply a difference P in pressure to the thickness h of the cell partition wall and the cell span 1 can be calculated by the use of the formula: $\sigma = P/2(1/h)^2$ In the case that the difference in pressure between the raw material gas side and the permeated gas side is 50 atm. and the material strength is 100 MPa, it is required that the cell pitch is 1.3 mm or less to obtain a cell partition wall having a thickness of 200 $\mu$m, and that the cell pitch is 4 mm or less to obtain a cell partition wall having a thickness of 500 $\mu$m according to the above formula.

Figure 3A:
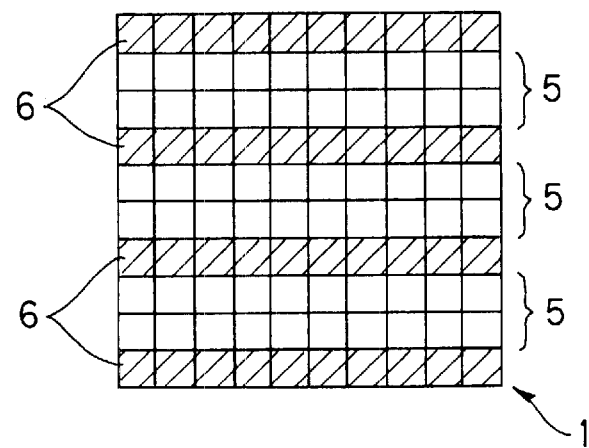
FIGS. 3(a) and 3(b) are schematic front views showing each embodiment of disposition of gas flow passages in a honeycomb type gas separating membrane structure of the present invention.
Figure 3B:
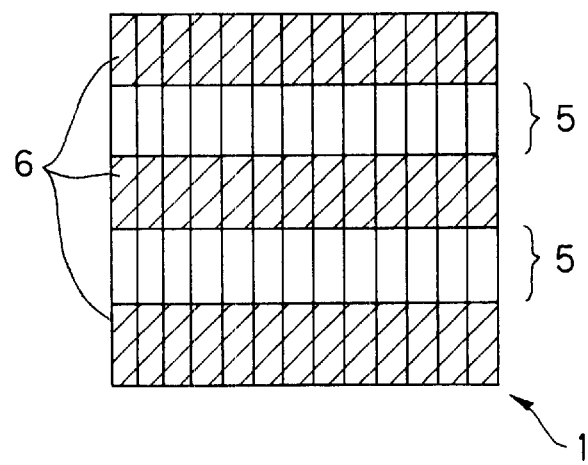

In a honeycomb type gas separating membrane structure of the present invention, it is not required that a sectional area of a gas flow passage on the raw material gas side is the same as that on the permeated gas side, and the sectional areas can be freely adjusted in consideration of reaction speed, flow rate, and the case of having a difference in pressure between the raw material gas side and the permeated gas side (see FIGS. 3(a), 3(b)).

For example, in the case that there is a difference in pressure between the raw material gas side and the permeated gas side, as shown in FIG. 3(b), a cell span can be widened with regard to partition walls which are not positioned between the raw material gas side and the permeated gas side.

It is not required to give all the partition walls the same thickness. The partition walls between the raw material gas side and the permeated gas side are required to be as thin as possible, and the other walls can be suitably thickened without creating a problem in view of strength upon production.

Figure 4A:
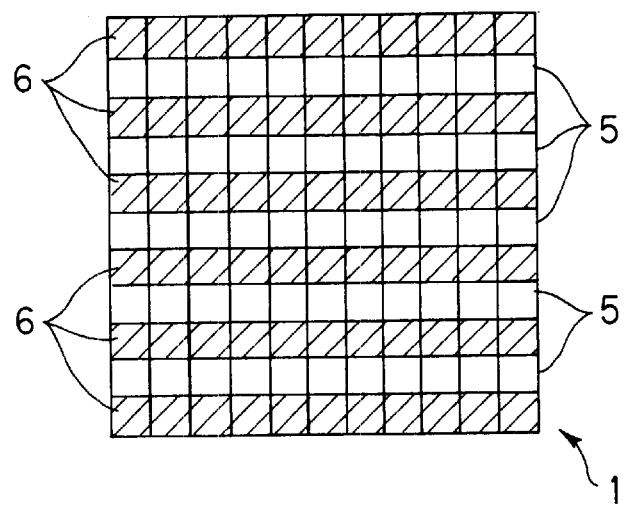
FIGS. 4(a) and 4(b) are schematic front views showing each embodiment of shapes of a honeycomb type gas separating membrane structure of the present invention.
Figure 4B:
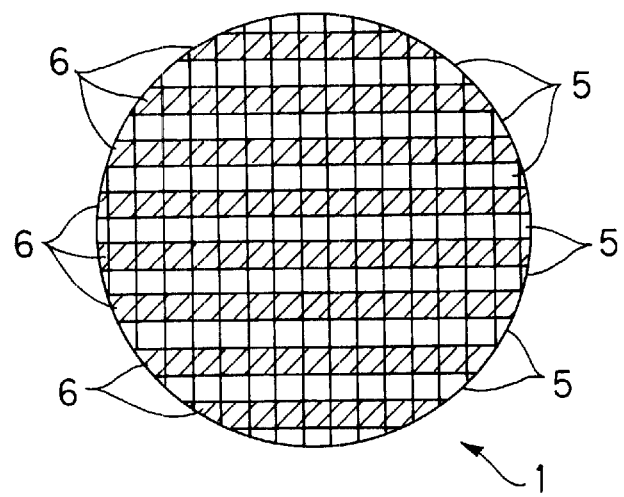

Further, the shape of a honeycomb type gas separating membrane structure of the present invention is preferably square or circular as shown in FIGS. 4(a) and 4(b). In the case that the shape is square (see FIG. 4(a)), the surface area can be effectively used, and the filling density can be increased when a plurality of membrane structures constitute a module. On the other hand, in the case that the shape is circular (see FIG. 4(b)), sealing is easy, the structure is strong against external impact.

The cell shape of a honeycomb type gas separating membrane structure of the present invention is not particularly limited, and for example, circular, square, or hexagonal shapes, or a mixture of these shapes may be suitably employed. In the case that permeation area on the raw material gas side and the permeated gas side are made large, it is preferable to mainly employ a square shape.

The material having gas separation ability used in the present invention depends on kind of gas to be separated. For example, in the case that oxygen is permeated, La—Sr—Co—Fe—O, which has a perovskite structure, is representative. However, the material may have various compositions (see Terada et.al. Journal of Japan Chemistry Organization 1988, No. 7, pp 1084).

In addition, a material such as Sr—Fe—Co—O can be used, which is a stable material even in a reducing atmosphere and which has a layered perovskite structure, or the like.

The present invention is hereinbelow described in more detail with reference to the Example. However, the present invention is by no means limited to this Example.

EXAMPLE

Strontium carbonate, cobalt carbonate and iron nitrate are weighed to give a stoichiometric ratio of $(SrCo_{0.8}Fe_{0.2})$, dissolved in water, subjected to evaporation while being stirred, and then calcined for 10 hours at 850° C. in air to obtain a calcined powder. It was confirmed by an X-ray diffraction method that the obtained calcined powder has a single phase perovskite structure.

The aforementioned calcined powder was ground in a ball mill and subjected to sieving to obtain a powder having average particle size of about 0.8 $\mu$m. To the calcined powder were added 5% by weight of methyl cellulose (binder) and 30% by weight of water, in reference to the weight of the solid content of the calcined powder, to obtain a mixture.

Figure 5A:
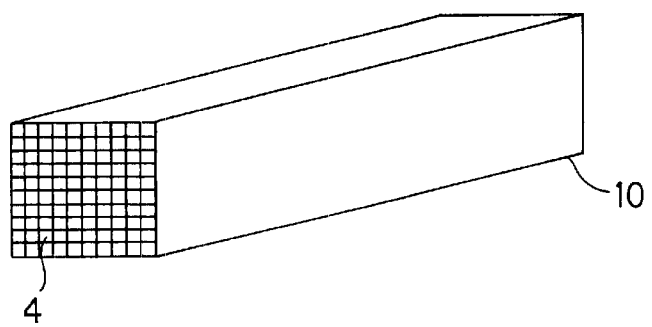
FIGS. 5(a), 5(b), and 5(c) are explanatory views showing an embodiment of a production process of a honeycomb type gas separating membrane structure of the present invention.
Figure 5B:
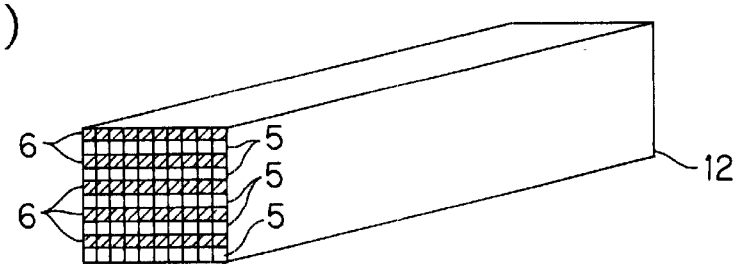
Figure 5C:
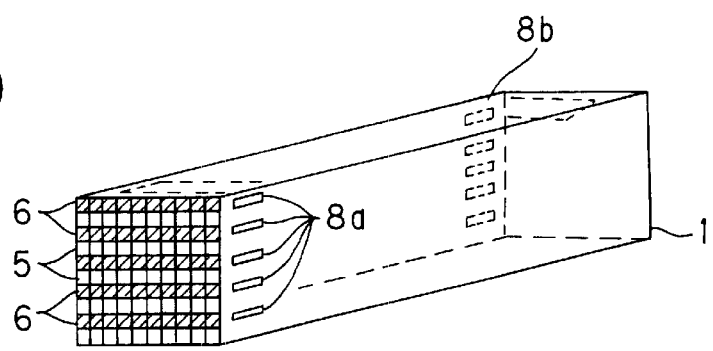

The mixture was subjected to kneading and then extrusion molding to obtain a honeycomb compact 10 having dimensions of 35 mm diameter×10 cmL (see FIG. 5(*a*)). A sealing material 6 having the same components as the calcined powder was applied to both end surfaces of the honeycomb compact by brushing on every other line for sealing. Only a peripheral wall had a thickness of 1 mm. Then, the honeycomb compact was fired for 5 hours at 1250° C. in the atmosphere to obtain a honeycomb fired body 12(FIG. 5(*b*)).

The obtained honeycomb fired body 12 had an apparent density of 95%, a thickness of a cell partition wall of 200 $\mu$m, a cell span of 3 mm, and the number of cells was 10 cells×10 cells.

Finally, slits 8*a* and 8*b* were formed by cutting so as to pass through the side surface of the cell passage 4 on a side surface of the honeycomb fired body 12 corresponding to the sealed cell passage 4 as shown in FIG. 1(*b*) to obtain a honeycomb type gas separating membrane structure I shown in FIG. 5(*c*). Then, a performance evaluation test of the honeycomb type gas separating membrane structure was performed using an apparatus shown in FIG. 6.

A vitreous powder was applied in peripheral portions of the upper and lower ends of the honeycomb type gas separating membrane structure 1, which was then brought into contact with square-shaped alumina tubes 20*a* and 20*b* and pressed by the mechanical force of a spring. In such a condition, the honeycomb type gas separating membrane structure 1 was perpendicularly disposed inside a quartz tube 24 in an electric furnace 28 having a thermocouple 30.

The gap between the honeycomb type gas separating membrane structure 1 and the quartz tube 24 was filled with a quartz wool 26. They were arranged so that air in the quartz tube 24 flowed mainly into the honeycomb type gas separating membrane structure 1.

The vitreous powder was molten at a high temperature to work as glass seals 22*a* and 22*b* to seal the upper and lower ends of the honeycomb type gas separating membrane structure 1 and the alumina tubes 20*a* and 20*b*.

Figure 6:
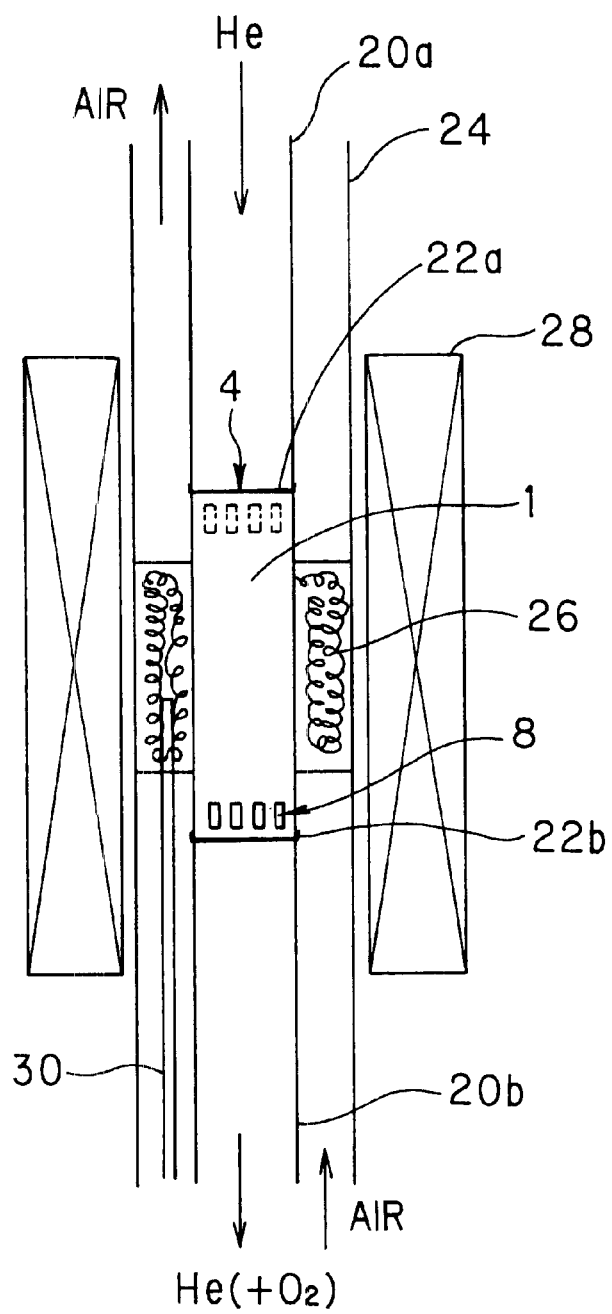
FIG. 6 is a schematic block diagram showing an embodiment of an apparatus for performance evaluation test of a honeycomb type gas separating membrane structure used in the Example.

Next, as shown in FIG. 6, He gas was introduced from upside to downside of the honeycomb type gas separating membrane structure 1 on the side of cell passage 4 (the side of permeated gas) at a rate of 20 Nl/min. With circulating air from the bottom to the top of the side of the slit 8 (raw material gas side) disposed on the side surface of the honeycomb type gas separating membrane structure 1, the honeycomb type gas separating membrane structure 1 was measured for permeation of oxygen and leakage of air at the time that the electric furnace 28 was heated up to 850° C. at the rate of 10° C./min.

As a result, the (average) permeation of oxygen was 6.5 Nml/min·cm².

With regard to the leakage of air of the honeycomb type gas separating membrane structure, nitrogen concentration in the permeated gas was 0.01% or less by a gas chromatography, and no leakage of air was confirmed. The (average) permeation of oxygen of the honeycomb type gas separating membrane structure was determined by measuring oxygen concentration of He gas in the discharge port on the permeated gas side by an oxygen sensor.

In a honeycomb type gas separating membrane structure of the present invention, a support means for supporting a gas separating membrane is unnecessary, the membrane area can be enlarged, and costs are reduced because the production process is simple.

What is claimed is:

1. A gas-separating membrane structure having a honeycomb unitary structure providing parallel passages separated by partition walls formed as a dense body of material adapted to perform separation of a specific gas from a gas mixture containing said specific gas by transfer of said specific gas through said dense material under a gas pressure difference, wherein a plurality of first passages are provided for said gas mixture containing said specific gas to be separated, and a plurality of second passages are provided for receiving said separated specific gas, said honeycomb structure having opposite end faces and a periphery extending between said end faces parallel to said passages, wherein one of said first passages and said second passages are blocked at said end faces and accessed through slits provided in said periphery, and each of said first passages and said second passages have an inlet and an outlet.

2. A gas-separating membrane structure according to claim 1, wherein said partition walls between said first and said second passages have a thickness in a range of 50 $\mu$m–500 $\mu$m.

3. A gas-separating membrane structure according to claim 2, wherein the respective gas flows along said first and said second passages in opposite directions through said honeycomb structure.

4. A method of separating a specific gas from a gas mixture, comprising the step of:

passing said specific gas through a gas-separating membrane structure according to claim 3, wherein said dense body is made of a material having gas separation capability for said specific gas.

5. A method of separating a specific gas from a gas mixture, comprising the step of:

passing said specific gas through a gas-separating membrane structure according to claim 2, wherein said dense body is made of a material having gas separation capability for said specific gas.

6. A gas-separating membrane structure according to claim 1, wherein the respective gas flows along said first and said second passages in opposite directions through said honeycomb structure.

7. A method of separating a specific gas from a gas mixture, comprising the step of:

passing said specific gas through a gas-separating membrane structure according to claim 6, wherein said dense body is made of a material having gas separation capability for said specific gas.

8. A method of separating a specific gas from a gas mixture, comprising the step of:

passing said specific gas through a gas-separating membrane structure according to claim 1, wherein said dense body is made of a material having gas separation capability for said specific gas.

* * * * *